(12) United States Patent
Frydendal et al.

(10) Patent No.: US 12,352,244 B2
(45) Date of Patent: Jul. 8, 2025

(54) FLUID FILM BEARING COMPRISING BEARING PADS AND METHOD OF REPLACING BEARING PADS

(71) Applicant: Siemens Gamesa Renewable Energy A/S, Brande (DK)

(72) Inventors: Niels Karl Frydendal, Herning (DK); Kim Thomsen, Skørping (DK); Morten Thorhauge, Ry (DK); Anders Vølund, Vanløse (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 128 days.

(21) Appl. No.: 18/242,796

(22) Filed: Sep. 6, 2023

(65) Prior Publication Data

US 2024/0093673 A1    Mar. 21, 2024

(30) Foreign Application Priority Data

Sep. 21, 2022 (EP) .................................... 22196818

(51) Int. Cl.
*F03D 80/50* (2016.01)
*F03D 80/70* (2016.01)
*F16C 17/10* (2006.01)

(52) U.S. Cl.
CPC ........... *F03D 80/50* (2016.05); *F03D 80/703* (2023.08); *F16C 17/10* (2013.01); *F05B 2230/80* (2013.01); *F05B 2240/53* (2013.01); *F05D 2240/53* (2013.01); *F16C 2237/00* (2013.01)

(58) Field of Classification Search
CPC .......... F16C 17/03; F16C 17/06; F16C 33/08; F16C 33/26; F16C 2237/00; F05D 2240/53; F05B 2230/80; F05B 2240/53
See application file for complete search history.

(56) References Cited

U.S. PATENT DOCUMENTS

| | | | |
|---|---|---|---|
| 8,936,397 B2* | 1/2015 | Pedersen | F16C 43/02 384/282 |
| 9,145,869 B2* | 9/2015 | Thomsen | F03D 80/70 |
| 11,280,320 B2* | 3/2022 | Claramunt Estecha | F16C 17/10 |
| 11,384,728 B2 | 7/2022 | Elmose | |
| 11,486,446 B2* | 11/2022 | Hoelzl | F16C 17/02 |
| 12,049,921 B2* | 7/2024 | Julliand | F16C 17/107 |
| 12,123,402 B2* | 10/2024 | Waldl | F16C 17/10 |

(Continued)

FOREIGN PATENT DOCUMENTS

| | | |
|---|---|---|
| EP | 3 460 272 A1 | 3/2019 |
| EP | 3 904 711 A1 | 11/2021 |
| EP | 3904710 A1 | 11/2021 |

(Continued)

*Primary Examiner* — James Pilkington

(57) ABSTRACT

A fluid film bearing for a rotor hub of a wind turbine is provided including a first part and a second part rotatably coupled to each other about a longitudinal axis. The first part includes an annular first sliding surface extending in the circumferential direction of the fluid film bearing along the first part. In addition, the second part includes a support structure and a first group of bearing pads coupled to the support structure and having a bearing pad sliding surface configured to slide on the first sliding surface. In addition, the support structure includes a plurality of openings for replacing the bearing pads.

15 Claims, 6 Drawing Sheets

(56) References Cited

U.S. PATENT DOCUMENTS

2003/0039419 A1 2/2003 Wobben
2021/0079899 A1 3/2021 Demissie et al.

FOREIGN PATENT DOCUMENTS

NO 339370 B1 12/2016
WO 2013/034391 A2 3/2013

* cited by examiner

FLUID FILM BEARING COMPRISING BEARING PADS AND METHOD OF REPLACING BEARING PADS

CROSS-REFERENCE TO RELATED APPLICATIONS

This application claims priority to EP Application No. 22196818.3, having a filing date of Sep. 21, 2022, the entire contents of which are hereby incorporated by reference.

FIELD OF TECHNOLOGY

The following relates to a fluid film bearing comprising bearing pads. The following further relates to a method of replacing bearing pads in a fluid film bearing. The following further relates to a wind turbine comprising the fluid film bearing.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

In wind turbines, rotatable components like the hub or a rotatable shaft have to be supported on the stationary parts of the wind turbine. Therefore, one or more bearings are used. Due to the loads, which act on the rotatable parts of the wind turbine during operation, a bearing used to support the rotatable components of the wind turbine on the stationary components may suffer from wear or damage so that repair procedures and/or maintenance procedures for maintaining the functionality of the bearing involving a removal of the bearing from the wind turbine are frequently required. However, due to the size and the weight of the bearings, especially of a main bearing of a wind turbine, these procedures may be tedious and involve external cranes and, in the case of offshore wind turbines, also the usage of vessels for supporting the external crane used for removal and/or replacement of the bearing.

In EP 3 460 272 A1, a method for changing a bearing component of a main bearing of a wind turbine is described. The bearing component is unloaded by mechanically moving the shaft, wherein the bearing component is then moved axially from or into its mounting position by means of a replacement tool device. This procedure is burdensome and requires a lot of equipment and complex manoeuvres.

In particular for fluid film bearings, such as the one disclosed in document WO 2013/034391 A2, which comprise a plurality of bearing pads mounted on a bearing ring to allow the rotation of the components, the high loads transferred by the bearing have to be supported by the bearing pads, which due to the sliding movement allowing the rotation of the bearing are prone to wear.

Especially fluid film bearings for relatively heavy and strongly loaded parts, like the hub of a wind turbine, endure high wear and tear at the sliding surfaces of the bearing pads. While this wear and tear is reduced with the fluid film developing between the bearing pad sliding surface and the sliding surface of the bearing ring, a certain amount of wear and tear is still unavoidable, since the fluid film is only established in these bearings once a certain rotational speed is reached. Thus, it is necessary to exchange the pads of fluid film bearings in specific intervals to ensure a correct function of the fluid film bearings.

The bearing pads are arranged between the two rings of the bearing and do not have an easy access for the service tasks. An exchange of bearing pads of fluid film bearings is problematic, as to provide access to the bearing pads, it is necessary to provide a dedicated crawl space allowing access to the space between the rings.

Alternatively, access to the bearing pads can be provided from within the bearing. It is known from EP 3 904 711 A1 that bearing pads can be exchanged through openings in the support structure of the bearings. According to this document, for each bearing pad an opening is provided at the support structure to allow the replacement of each single bearing pad through the respective opening. The opening is positioned close to the pad so that a direct replacement through the opening is possible. In embodiments, the method presented in this document provides an efficient and cheaper way of replacing bearing pads compared to other methods of hoisting the bearing components out of the wind turbine for replacement, but each opening at the support structure weakens the structural integrity of the bearing. This solution can only be applied for a limited number of bearing pads, which greatly restricts the loads that can be transferred by the bearing and thus the potential load capacity of the bearing. However, the increasing size of wind turbines and the increasing loads modern wind turbines have to endure require a high number of pads to be able to support these high loads. Hence, the solution presented in document EP 3 904 711 A1 is not suitable for modern wind turbines.

SUMMARY

An aspect relates to a fluid film bearing for wind turbines with a reduced complexity and cost that is also service friendly. An aspect also relates to a method for replacing fluid film bearing pads which is easier to carry out than the ones known in the conventional art.

According to embodiments of the invention, a fluid film bearing for a rotor hub of a wind turbine comprises a first part and a second part rotatably coupled to each other about a longitudinal axis. The first part comprises an annular first sliding surface extending in the circumferential direction of the fluid film bearing along the first part. The second part comprises a support structure and a first group of bearing pads coupled to the support structure and having a bearing pad sliding surface configured to slide on the first sliding surface. The support structure comprises a plurality of openings for replacing the bearing pads.

The bearing pads can be tilting bearing pads or non-tilting bearing pads or a combination of both and support the rotatable part of the bearing on the stationary part of the bearing in an axial and/or radial direction.

A bearing pad may comprise several components, e.g., an outer bearing part, a support part for attachment to a structure by bolts or similar, a tilting support part to ensure that the bearing pad is able to tilt and/or a resilient means like e.g., a spring to ensure a preloading of the bearing pad and the tilting support.

In a fluid film bearing, a fluid film develops between the bearing pad sliding surface and the annular first sliding surface of the first part. Depending on the configuration, the first part can be the rotating part of the bearing. Alternatively, the first part can be the stationary part of the bearing.

According to embodiments of the invention, the number of openings in the support structure is lower than the number of bearing pads so that at least two bearing pads can be replaced through one of the openings.

This is particularly advantageous, as openings in the support structure weaken the support structure, because drilling openings in the support structure weaken the material around the opening, which may lead to cracks in the bearing. Mechanical stress may further create a risk of fractures in the material and the region of opening is prone to such fractures due to the weaker material properties. Hence, less openings result in a strengthened support structure compared to the support structures known from the conventional art.

The pad sliding surface, the annular first sliding surface and any other sliding surfaces discussed below can be coated to further reduce friction, e.g., with babbitt, white metal, a polymer or some other material. Different sliding surfaces can be coated with different materials or the same material. It is also possible to leave some or all of the sliding surfaces without a coating or other surface treatment.

According to an embodiment of the invention, the first group of bearing pads comprises axial bearing pads. Axial bearing pads support the first part on the second part, in particular on the support structure of the second part, axially. In an embodiment, the first part is the rotatable part supported on the second part, which is the stationary part, in an axial direction.

In an embodiment, at least a part of the plurality of openings for replacing the bearing pads are axial openings arranged circumferentially for axially displacing the bearing pads through the openings for replacing the bearing pads. Hence, the bearing pads are removable and/or insertable through the axial openings. By providing the openings in the circumference of the stationary part, a removal, and an insertion of the sliding pads in the axial direction is enabled.

In an embodiment, at least a part of the plurality of openings for replacing the bearing pads are radial openings arranged circumferentially for radially displacing the bearing pads through the openings for replacing the bearing pads. Hence, the bearing pads are removable and/or insertable through the radial openings. By providing the openings in the circumference of the stationary part, a removal and an insertion of the sliding pads in the radial direction is enabled.

According to another embodiment of the invention, the first part further comprises an annular second sliding surface extending in the circumferential direction of the fluid film bearing along the first part. The second part further comprises a second group of bearing pads coupled to the support structure and having a bearing pad sliding surface configured to slide on the second sliding surface. The second group of bearing pads comprises radial bearing pads.

To allow for a smooth rotation of the inner and outer part with respect to each other all used sliding surfaces are essentially parallel to the circumferential direction of the bearing. Small angles of e.g., less than one degree between the surface of the respective sliding surface and the circumferential direction can appear due to tolerances during production, a misalignment of components, etc.

According to another embodiment of the invention, the first part further comprises an annular third sliding surface extending in the circumferential direction of the fluid film bearing along the first part. The second part further comprises a third group of bearing pads coupled to the support structure and having a bearing pad sliding surface configured to slide on the third sliding surface. The third group of bearing pads comprises axial bearing pads.

According to another embodiment of the invention, the first part is arranged on an outer circumference of the second part and/or radially outwards of the second part. With this configuration, the pads are more easily accessible as they can be replaced from the radially inner part of the second part, which is more easily accessible than the radially outer part of the first part. Hence, the first part is arranged on an outer circumference of the second part.

According to another embodiment of the invention, the openings are arranged at the outer circumference of the second part.

In an embodiment, the bearing pad is replaced from an interior of the stationary part through an opening in the outer circumference of the stationary part. The replacement of the bearing pad from an interior of the stationary part, hence the removal of the bearing pad and the insertion of a replacement bearing pad, has the advantage that the bearing pads are easily accessible from the interior of the stationary part, in particular when the bearing is used as a main bearing in a wind turbine.

According to another embodiment of the invention, the first part is a rotatable part, and the second part is a stationary part.

The bearing pads thus support the rotatable part of the bearing on the stationary part of the bearing in an axial and/or radial direction.

The bearing pads may be arranged for instance in between the annular rotatable part and a stationary part of the bearing supporting the rotatable part on the stationary part.

The stationary part may be for instance a hollow shaft, or connected to a hollow shaft, respectively, wherein the bearing pads are accessible from the interior of the hollow shaft through one or more openings in the outer circumference of the stationary part. The bearing pads, which are arranged for instance between the outer circumference of the stationary part and the rotatable part arranged on an outer circumference of the stationary part and supported by the bearing pads on the stationary part, may be removed and/or replaced at least partly in a radial direction towards the interior, hence towards the centre, of the stationary part. The stationary part may provide one or more openings in its outer circumference, which allow to access the bearing pads.

According to another embodiment of the invention, the fluid film bearing comprises an annular rotatable part, a stationary part and a plurality of bearing pads, wherein the stationary part is annular and the rotatable part is arranged on a circumference of the stationary part, wherein the rotatable part is supported on the stationary part by the bearing pads in a radial and/or an axial direction, wherein the stationary part comprises a plurality of axial and/or radial openings arranged circumferentially and/or axially displaced in the circumference of the stationary part, wherein the bearing pads are removable and/or insertable through the openings.

By providing the openings in the circumference of the stationary part, an axial and/or radial removal and/or an axial and/or radial insertion of the bearing pads is enabled. The rotatable part may be arranged either on an inner circumference of the stationary part or on an outer circumference of the stationary part.

Bearing pads that support a rotatable part arranged on the outer circumference of the stationary part may be removed in a radial inward direction towards a centre point of the annular stationary part. Correspondingly, bearing pads that support a rotatable part on the inner circumference of the stationary part may be replaced in a radially outward direction through the openings in the circumference of the stationary part. Radially supporting bearing pads may be removed for instance from an inside of the bearing by moving them axially out of a cavity, or a recess, respectively, comprising an axial opening and housing the radially supporting bearing pad.

According to another embodiment of the invention, the bearing pads are kept in position between the first part and the second part by coupling means applying a load between the first part and the second part, thereby applying a force to the bearing pads arranged between the first part and the second part and preventing the bearing pads to shift. The coupling means are configured to release the load between the first part and the second part by untightening the coupling means.

According to another embodiment of the invention, the coupling means are bolts.

In an embodiment, the bearing pads are fixed to the bearing by a bolted connection applying a force to the bearing pad, wherein the force is released by untightening of the bolted connection, and/or by a form-fit connection.

In an embodiment of the invention, the bearing comprises an actuator arrangement with one or more actuators, in particular at least one mechanical actuator and/or at least one hydraulic actuator, wherein the actuator arrangement is adapted for removing a load of the rotatable part from at least one of the bearing pads. The at least one actuator of the actuator arrangement may be arranged inside a bearing case of the bearing. It is also possible that the at least one actuator is mounted to an outside of a bearing case of the bearing, wherein a coupling of the actuator towards the rotatable part and the stationary part occurs for instance via a piston. It is also possible that the bearing comprises at least one mechanical actuator and at least one hydraulic actuator, wherein the at least one mechanical actuator is used to secure the rotatable part displaced by the at least one hydraulic actuator in the displaced position.

In an embodiment of the invention, the at least one actuator of the actuator arrangement is arranged circumferentially displaced from the bearing pads. The bearing pads may be arranged between the stationary part and the rotatable part circumferentially and/or axially displaced for supporting the rotatable part both in the radial and/or the axial direction on the stationary part. In an embodiment, the at least one actuator of the actuator arrangement is arranged circumferentially displaced from each of the bearing pads. By providing an actuator arrangement comprising a plurality of actuators, the individual actuators may be arranged for instance circumferentially in between the bearing pads so that a compact size of the bearing is obtained.

In an embodiment of the invention, the actuator arrangement comprises at least one radial actuator arranged at least partly in between the stationary part and the rotatable part for applying a radial force on the rotatable part and/or at least one axial actuator arranged at least partly between the rotatable part and a protrusion on the circumference of the stationary part for applying an axial force on the rotatable part. The protrusion may be for instance a bearing cover mounted to the stationary part or a protrusion of the circumference of the stationary part. The protrusion may protrude from the circumference in particular adjacently to the rotatable part, so that at least one actuator may be arranged between the protrusion and the rotatable part for applying a force on the rotatable part for unloading one or more of the bearing pads.

In an embodiment, the bearing comprises a bearing case, wherein the actuator arrangement is arranged inside the bearing case. The bearing case may be formed for instance at least partly by a bearing cover and/or the rotatable part and/or the stationary part, wherein the bearing case houses in particular the contact area between the bearing pads, the rotatable part and/or a fluid used in the bearing.

Hence, bearing pads typically comprise a contact area that forms the sliding surface of the pad, also named the bearing pad sliding surface, and a support part, such as a bearing case, used to mount the contact area to the second part. The connection between the contact area and the support part typically allows the contact area to tilt in at least one direction to compensate for slight misalignments of the inner and outer part and for tolerances. The contact area can be connected to the support part e.g., by a pivot, a ball-in-socket connection or a flex support. Various approaches for providing such pads are known in the conventional art. It should be noted that in some cases only the contact area is considered to be the pad and the support part is considered to be the pad support. The connection between the contact area and the support part can also be formed as a single piece, e.g., in the case of a flex support, the combination of these parts can simply be referred to as pad.

In an embodiment, the one or more actuators of the actuator arrangement each are fixed to the stationary part or the rotatable part of the bearing. During actuation of the at least one actuator, the actuator fixed to one of the parts of the bearing may couple to the respective other part of the bearing to apply a force on the other part to create a displacement between the stationary part and the rotatable part causing an unloading of at least one of the bearing pads of the bearing. The at least one actuator may be attached directly or indirectly to the stationary part or the rotatable part, respectively.

In an embodiment of the invention, the force is applied to the first part using the actuator arrangement comprising at least one actuator, in particular at least one mechanical actuator and/or at least one hydraulic actuator. The at least one actuator of the actuator arrangement may push away the first part from the bearing pad, so that the bearing pad is unloaded from the weight of the first part. Therefore, already a small displacement, for instance about 1 mm, is sufficient. By the actuator arrangement, a force to the first part can be applied prior to the replacement of the bearing pad and removed after replacement of the bearing pad, respectively. As a hydraulic actuator, for instance a hydraulic jack may be used.

The actuator arrangement and/or the bearing may comprise a mechanical fixture device which fixes the first part in its displaced position for securing it for instance in the event of a power loss of a hydraulic actuator. As mechanical actuator, for instance a screw or a threaded bolt may be used to push away the first part from the second part. It is possible that at least one mechanical actuator and at least one hydraulic actuator are used, wherein the at least one mechanical actuator is used as mechanical fixture device to secure the first part displaced by the at least one hydraulic actuator in the displaced position.

In an embodiment, an axial force on the first part of the bearing for replacement of an axially supporting bearing pad and/or a radial force for replacement of a radially supporting bearing pad is applied by the actuator arrangement. For replacement of a bearing pad, which supports the first part of the bearing in a radial direction on the second part, a radial force may be applied to the first part by the actuator arrangement unloading the radially supporting bearing pad. Correspondingly, for unloading an axially supporting bearing pad, an axial force may be applied to the first part by the actuator arrangement for unloading the axially supporting bearing pad. For unloading a bearing pad, which supports the first part both in a radial and in an axial direction, a combination of a radial force and an axial force can be applied to the rotatable part using the actuator arrangement. The actuator arrangement may comprise one or more radial actuators, which can apply each a radial force, and/or one or more axial actuators, which can apply each an axial force.

In an embodiment of the invention, at least one actuator of the actuator arrangement is detachably mounted to the bearing prior to the removal of the load from the bearing pad to be replaced and/or at least one actuator of the actuator arrangement is permanently mounted to the bearing. The unloading of the bearing pad can be conducted using an actuator arrangement which is permanently mounted to the bearing. This allows for instance to arrange the at least one actuator of the actuator arrangement inside a bearing case, so that the actuator can act directly on the first part of the bearing.

It is also possible that at least one actuator of the actuator arrangement is detachably mounted to the bearing prior to the removal of the load from the bearing pad to be replaced, so that no actuator has to be provided as part of the bearing.

An actuator of the actuator arrangement mounted in the course of the replacement procedure may be attached for instance to an outer side of a bearing case of the bearing, wherein the force created by the at least one actuator is applied for instance by coupling a piston of the actuator to the rotatable part of the bearing. The actuator may be fixed on either the stationary part or the rotatable part, wherein the actuator is coupled to the respective other part allowing a displacement between the rotatable part and the stationary part of the bearing to unload one or more of the bearing pads. For coupling, the piston of the actuator may be arranged inside an orifice of a bearing cover, the stationary part and/or the rotatable part, respectively.

In an embodiment of the invention, prior to the insertion of the replacement bearing pad, a surface treatment of a surface of the stationary part and/or a surface of the rotatable part is conducted. The surface treatment may be for instance a surface milling operation conducted to clean and/or to repair a surface of the stationary part and/or a surface of the rotatable part. This allows to clean the surface at the position of the bearing pad, so that for instance dirt and/or residues from the bearing pad can be removed from the surfaces. Also, corrosion and/or fretting effects can be removed by the surface treatment.

Therefore, a portable machining device may be mounted in the space where the bearing pad is usually mounted. The surface milling operation may be carried out for instance on an interface of the stationary part with the bearing pad to remove affected material. In an embodiment, the milling device may include a cover arrangement adapted to the size of an opening of the outer circumference of the stationary part, in which the milling device is inserted. By the cover arrangement, the surface that is subject to the surface treatment may be covered to seal the treated surface from the surrounding, in particular from the interior of the bearing. This may prevent contamination of an interior of the bearing, hence an undesired intrusion of dust or the like created during the surface treatment into an interior of the bearing is inhibited.

According to another embodiment of the invention, each bearing pad is arranged in a cavity or a recess of the support structure.

The bearing pad may be arranged in a cavity or a recess of the stationary part. By untightening the bolted connection, the force may be removed to unload the bearing pad, so that it can be removed for instance towards the interior of the stationary part. Vice versa, the replacement bearing pad can be inserted and fixed again to the bearing by tightening of the bolted connection after the replacement of the bearing pad. The bolted connection may apply a force to the bearing pad enabling a support of the rotatable part on the bearing pad. By untightening the bolted connection, the force can be removed from the bearing pad and the bearing pad is unloaded, or the rotatable part is unsupported from the bearing pad, respectively. Vice versa, by tightening of the bolted connection, the force can be applied again to the bearing pad re-establishing the support of the rotatable part on the bearing pad. Additionally, or alternatively, the bearing pad is fixed to the bearing by a form-fit connection, wherein the bearing pad is arranged in a cavity or a recess of the stationary part. The cavity or the recess may be in particular an integral part of the stationary part and may be located in particular in its outer circumference. The bearing pad may be fixed in the cavity or the recess, respectively, by the rotating part resting on the bearing pad. One side of the cavity, or the recess, respectively, may comprise an axial opening for replacement of an unloaded bearing pad, in particular a radially supporting bearing pad.

Yet another aspect of embodiments of the invention relate to a method of replacing bearing pads of a fluid film bearing for a rotor hub of a wind turbine. The fluid film bearing comprises a first part and a second part rotatably coupled to each other about a longitudinal axis. The first part comprises an annular first sliding surface extending in the circumferential direction of the fluid film bearing along the first part. The second part comprises a support structure and a first group of bearing pads coupled to the support structure and having a bearing pad sliding surface configured to slide on the first sliding surface. The support structure comprises a plurality of openings for replacing the bearing pads.

According to embodiments of the method, the bearing pads are replaced through a first opening of the plurality of openings of the support structure by following the following steps:
  reducing a load between the first part and the second part by releasing a force applied to a first bearing pad and/or by applying a force to the first part and/or the second part,
  displacing the first bearing pad for reaching the first opening,
  pulling the first bearing pad through the first opening,
  inserting a replacement first bearing pad through the first opening and displacing the replacement first bearing pad to the original position of the replaced first bearing pad, and
  increasing the load between the first part and the second part by increasing the force applied to the replacement first bearing pad and/or by applying a force to the first part and/or the second part so that the replacement first bearing pad is kept in position.

The load between the first part and the second part can be removed by releasing a force applied to the bearing pad and/or by applying a force to the first part and/or the second part, so that one or more of the bearing pads become unloaded. When the load is removed at a part of the bearing, the weight of the bearing and of the components supported by the bearing is supported via the remaining bearing pads. The unloading of a bearing pad to be replaced may occur by removing a force, which acts on the bearing pad pressing it towards the sliding surface of the first part of the bearing. After removing the force, the bearing pad is not tensioned anymore between the rotatable part and the stationary part.

Additionally, or alternatively, the bearing pad to be replaced can also be unloaded by applying a force in particular directly to the first part, so that the first part is lifted and/or displaced and the weight of the first part is not supported anymore on the bearing pad to be replaced.

After removing the load, the unloaded bearing pad can be displaced in an axial and/or a radial direction of the bearing for reaching the first opening. The bearing pad can be pulled in a radial inward direction to the centre of the bearing, hence in the direction of a centre point of the annular rotatable part in order to pull the bearing pad through the first opening. Alternatively, the bearing pad can be removed in a radial outward direction in order to pull the bearing pad through the first opening. Also, a combination of an axial and a radial movement for removing the bearing pad is possible. The removal of the bearing pad at least partly in a radial direction has the advantage that no access, or a reduced access space, respectively, from the axial direction to the fluid film bearing is required. Furthermore, both bearing pads that support the bearing in the axial direction and bearing pads that support the first part in the radial direction on the second part can be removed at least partly in the radial direction facilitating the replacement of the bearing pad.

After the removal of the bearing pad, a replacement bearing pad is inserted at the position of the removed bearing pad. The replacement bearing pad may be for instance a new bearing pad or it can be the removed bearing pad, which has been subject to maintenance and/or repair procedures, for instance cleaning procedures or the like. Also, the insertion of the replacement bearing pad may occur in a radial direction, in particular in reverse direction to the removal of the bearing pad.

After insertion of the replacement bearing pad, the first part of the bearing is supported on the replacement bearing pad by applying a force to the replacement bearing pad and/or by removing the force applied to the first part. By applying a force to the replacement bearing pad, the replacement pad is pushed towards and/or pressed on the first part of the bearing, so that the first part is supported again on the bearing pad and therefore also supported on the second part of the bearing. Additionally, or alternatively, also the force, which has been applied to the first part for unloading the bearing pad, may be removed, so that the first part is supported on the bearing pad again.

In embodiments of the invention, the method for replacing the bearing pad has the advantage that the bearing pads can be exchanged in-situ and one by one, so that an exchange of the entire bearing is not required even if all bearing pads of the bearing have to be replaced. This facilitates the maintenance of the bearing, in particular for bearings used as main bearing in a wind turbine. Providing a plurality of bearing pads in the bearing allows for supporting the rotatable part on the stationary part on the remaining bearing pads of the bearing during the removal of the load of the rotatable part from one of the bearing pads, or a part of the bearing pads, respectively. This facilitates the repair and/or the maintenance of the fluid film bearing since for instance a one-by-one replacement of damaged or worn bearing pads becomes possible. Also, an updating of the bearing by replacing the mounted bearing pads by improved bearing pads as replacement pads is possible.

Contrary to an exchange of the entire bearing, no external cranes and/or vessels are required. Furthermore, since only single bearing pads are removed or inserted, respectively, the replacement of the bearing pads may be performed manually and/or by usage of a lifting device manually installable prior to the replacement procedure in the vicinity of the bearing. This significantly reduces the effort for replacing one or more of the bearing pads of the bearing facilitating repair procedures and/or maintenance procedures and reducing their costs.

According to another embodiment of the invention, a second bearing pad is replaced through the first opening following the steps for replacing the first bearing pad through the first opening.

According to another embodiment of the invention, a rope or string is attached to the first bearing pad and/or to the second bearing pad for pulling the first bearing pad and/or the second bearing pad through the first opening.

According to another embodiment of the invention, the first and second bearing pads are both replaced before the load between the first part and the second part is increased in the last step of the method.

Yet another aspect of embodiments of the invention relate to a wind turbine comprising a fluid film bearing for a rotor hub of the wind turbine. The fluid film bearing comprises a first part and a second part rotatably coupled to each other about a longitudinal axis. The first part comprises an annular first sliding surface extending in the circumferential direction of the fluid film bearing along the first part. The second part comprises a support structure and a first group of bearing pads coupled to the support structure and having a bearing pad sliding surface configured to slide on the first sliding surface. The support structure comprises a plurality of openings for replacing the bearing pads.

For a wind turbine according to embodiments of the invention, the details and advantages of a fluid film bearing according to the invention apply correspondingly. For a wind turbine according to embodiments of the invention and for a fluid film bearing according to embodiments of the invention, also the details and advantages of a method for replacement a bearing pad of a rotational fluid film bearing apply correspondingly.

BRIEF DESCRIPTION

Some of the embodiments will be described in detail, with reference to the following figures, wherein like designations denote like members, wherein.

DETAILED DESCRIPTION

Figure 1:
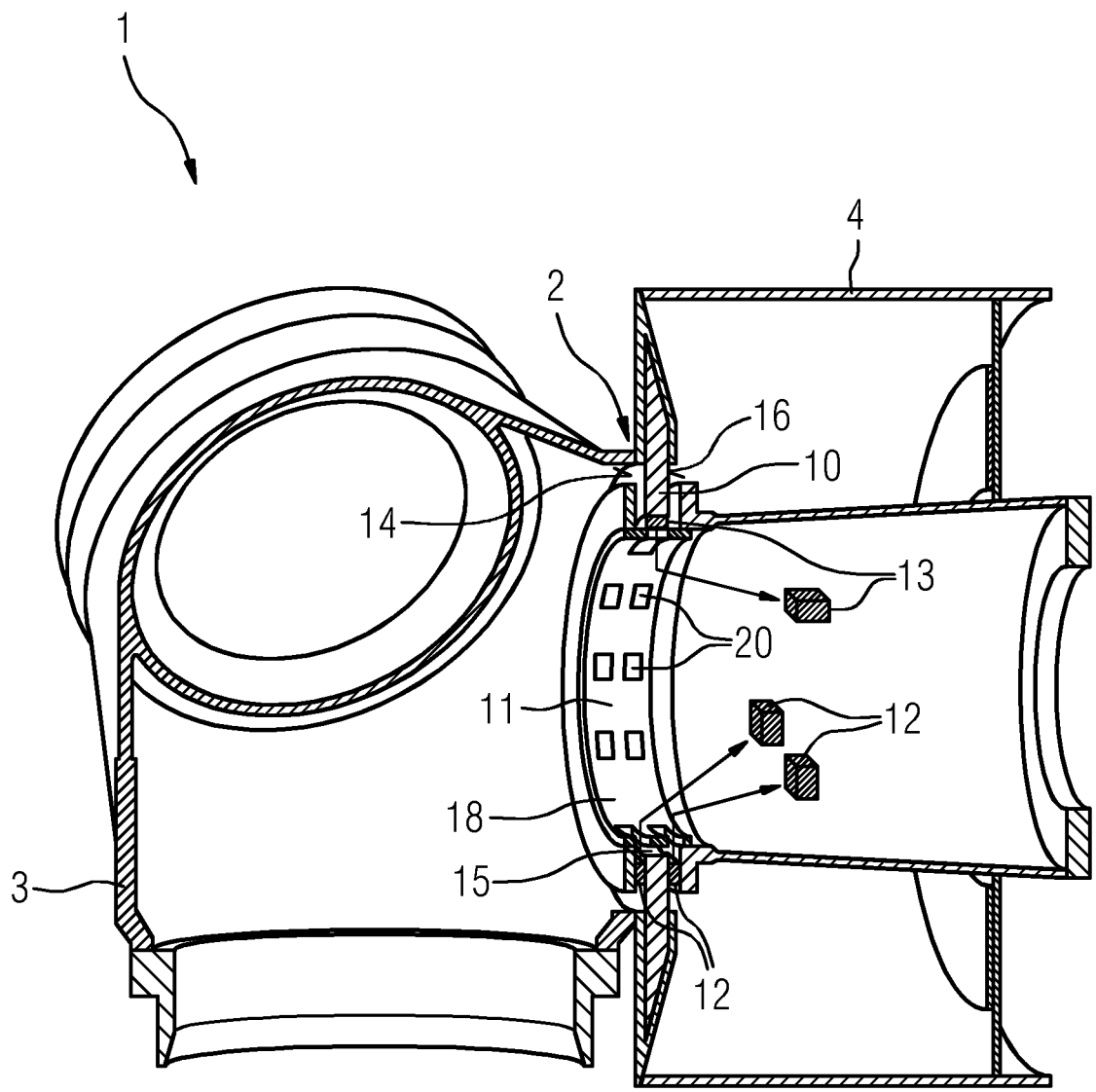
FIG. 1 shows a wind turbine comprising a fluid film bearing as known in the conventional art.

FIG. 1 shows a detailed view of a wind turbine 1 as known in the conventional art that comprises a rotor hub 3 rotatably connected to a housing 4 of a generator of the wind turbine 1 using a fluid film bearing 2. The rotor hub 3 is mounted to a first part 10 of the fluid film bearing 2 using a torque-prove connection, for example a flange connection. Alternatively, the hub 3 and the first part 10 can be formed, e.g., cast, as a single piece.

The first part 10 is also connected to the housing 4 using a torque-prove connection. The housing 4 can be used to carry a rotor of a generator of the wind turbine 1 that is not shown in FIG. 1 for reasons of simplicity and clarity.

The second part 11 of the fluid film bearing 2 has an annular shape and can be formed as one piece or connected to a stator shaft which carries the stator of the generator of the wind turbine 1 that is not shown for reasons of simplicity and clarity.

Hence, the first part 10 is the rotatable part of the fluid film bearing 2 connected to the rotor hub 3 and to the housing 4 and the second part 11 is the stationary part of the fluid film bearing 2 connected to the stationary shaft supporting the stator of the generator.

Details concerning the lubrication of the fluid film bearing, e.g., seals and pumps that can optionally be used to transport the lubricant, are omitted in the present figure.

The bearing pads 12, 13 are distributed along a circumference of the second part 11 in three different groups for supporting the first part 10. The first and third group of bearing pads 12, 13 is a group formed by axial bearing pads 12, which slide on the first and third sliding surface 14, 16 respectively and provide axial support in both axial directions. The second group of bearing pads 12, 13 is a group formed by radial bearing pads 13, which slide on the second sliding surface 15 and provide radial support. Therefore, the first part 10 is supported in both axial directions and in the radial direction on the second part 11.

Each of the bearing pads 12, 13 has a respective bearing pad sliding surface 17 that supports the annular first sliding surface 14 and the annular third sliding surface 16 of the first part 10 in the axial direction and the annular second sliding surface 15 in the radial direction. The sliding surfaces 14, 15, 16 can e.g., be coated to improve the robustness of the sliding surface and/or further reduce friction. While the sliding surfaces 14, 15, 16 are typically not in direct contact during the normal operation, since a thin lubricant film is arranged between the sliding surfaces 14, 15, 16, contact between the sliding surfaces 14, 15, 16 can e.g., occur at slow rotating speeds or when pumps used to transport the lubricant are not working.

The bearing pad sliding surface 17 can have a convex shape. The convex shape of the bearing pad sliding surface 17 can match the shape of the respective annular sliding surface 14, 15, 16, that is at least approximately circular in the same sectional plane. Another advantage of using a convex surface is an avoidance of acute angles at the edges of the bearing pad sliding surface 17. This can help to reduce wear and tear of the bearing pad sliding surface 17 and the annular sliding surface 14, 15, 16.

Bearing pads 12, 13 typically allow a certain amount of tilting of the bearing pad sliding surface 17 of the respective bearing pad 12, 13 with respect to a support section of the bearing pad 12, 13 used to support the bearing pad 12, 13 against a mounting surface or some other mounting point. The bearing pad sliding surface 17 is typically provided by a contact section that is mounted to the support section by a mechanism to allow for the tilting, e.g., by a pivot or a ball-in-socket connection. It is also possible to provide a flex support as the mechanism that allows tilting. The contact section and the support section can be formed from the same material connected by a thinner part of the same material forming the mechanism allowing the tilting.

The first part 10 is arranged on an outer circumference of the second part 11. The support structure 18 of the second part 11 comprises a plurality of openings 20 providing access to the bearing pads 12, 13 for replacing the bearing pads 12, 13. Each opening 20 corresponds to one bearing pad 12, 13, hence the number of openings 20 and the number of bearing pads 12, 13 is the same. In other words, for each bearing pad 12, 13 there is an opening 20 in the support structure 18 for replacement of the bearing pad 12, 13.

As indicated by the arrows, the bearing pads 12, 13 are radially removed and the replacement pads inserted into openings 20 of the support structure 18 of the second bearing part 11 when they need to be replaced. As each bearing pad 12, 13 has a specific opening 20 for this process, the bearing pad 12, 13 to be replaced is taken out of the seat in a radial direction towards the centre of the second part 12 of the fluid film bearing 2. This process applies to axial bearing pads 12 and to radial bearing pads 13.

After removal of bearing pads 12, 13 through the respective opening 20, the bearing pads 12, 13 can then be transported out of the fluid film bearing 2 and out of the wind turbine 1.

After removal of bearing pads 12, 13 through the respective opening 20, replacement bearing pads 12, 13 can be inserted through the respective openings 20 and be placed on the original position of the removed bearing pads 12, 13 between the support structure 18 and the first part 10.

In particular, the replacement of bearing pads 12, 13 may be performed manually or by using a lifting device manually installed prior to the replacement procedure in the vicinity of the fluid film bearing 2.

Figure 2:
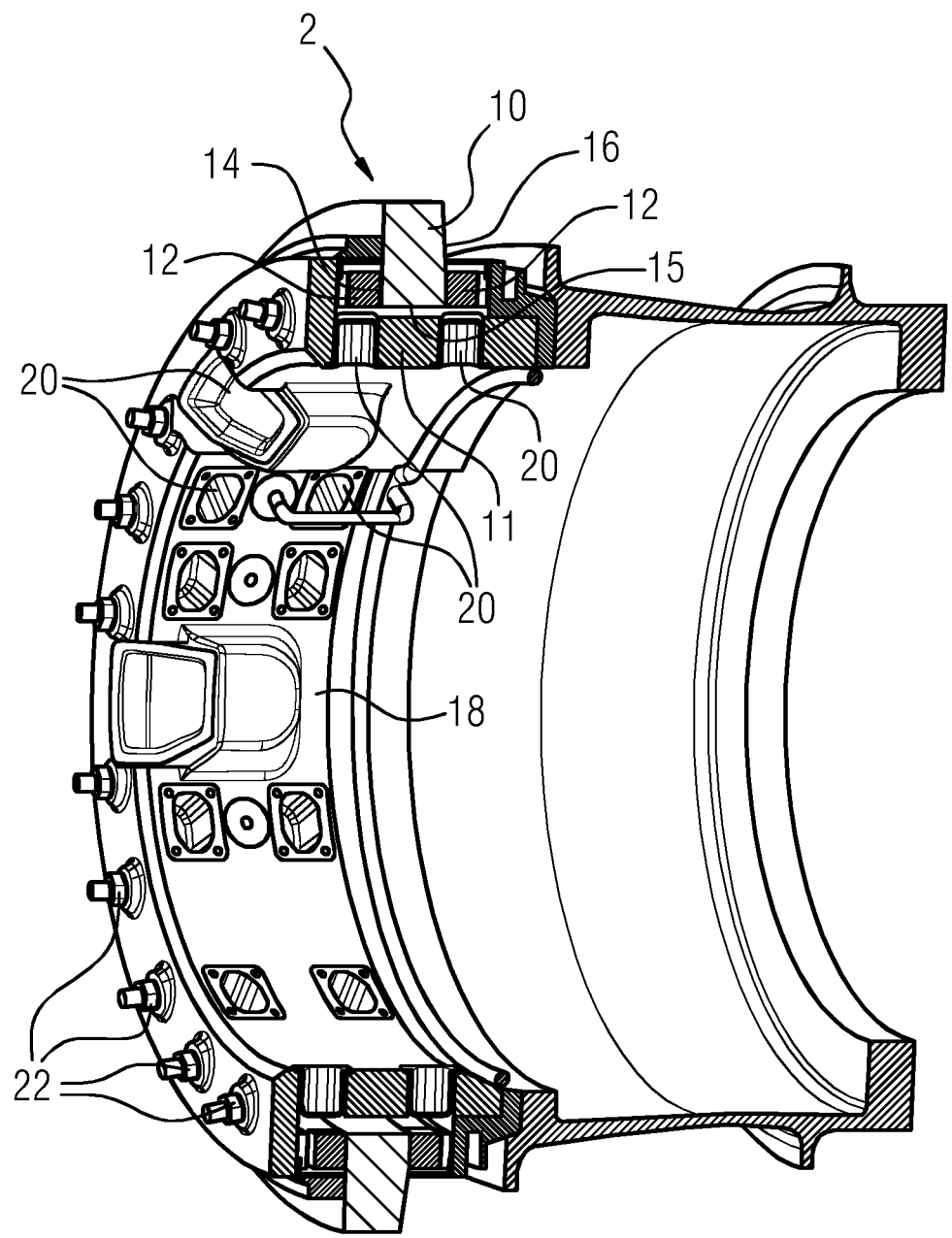
FIG. 2 shows a wind turbine comprising another fluid film bearing as known in the conventional art.

FIG. 2 shows another example of a fluid film bearing 2 known in the conventional art where for each bearing pad 12, 13, the support structure 18 comprises one opening 20.

Since the rotatable part, which is the first part 10 in this example, of the fluid film bearing 2 is supported on the stationary part, which is the second part 11 in this example, the bearing pad 12, 13 to be removed has to be unloaded from the weight of the first part 10. For unloading specific bearing pads, coupling means 22 can be untightened. The coupling means 22 shown in this Figure are bolts. By untightening the bolts close to a specific bearing pad 12, 13, the bearing pad 12, 13 can be removed and replaced.

Hence, the bearing pads 12, 13 are fixed between the support structure 18 and the first part by a bolted connection comprising a plurality of bolts fixating a cover plate (not shown in the figure) to the stationary part. By tightening the bolted connection, hence by bolting the plate to the stationary part using the bolts, the radially supporting bearing pad 12, 13 is pressed against the rotatable part of the fluid film bearing 2. In a mounted state of the radially supporting bearing pad 12, 13, a force is acting on the bearing pad due to the weight of the rotatable part of the fluid film bearing 2 and/or due to the bolted connection, respectively.

For removing the load of the rotatable part from the radially supporting bearing pad 12, 13, the bolted connection can be released, and the plate can be removed. Afterwards, the bearing pad 12, 13 can be removed from the fluid film bearing 2 in a radial direction towards the centre of the stationary part. After insertion of a replacement bearing pad 12, 13 into the opening 20, the plate can be fixed again to the stationary part by tightening the bolted connection. By tightening the bolted connection, the rotatable part of the fluid film bearing 2 is supported again on the replaced bearing pad 12, 13. When one of the radially supporting bearing pads 12, 13 is unloaded, the rotatable part on the bearing is supported on the remainder of the radially supporting bearing pad 12, 13 of the bearing and/or the axially supporting bearing pads 12 of the fluid film bearing 2, respectively.

It is also possible that the opening 20 is an axial opening of a radially cavity or a radially recess, in particular a radially inward recess in the outer circumference, of the stationary part housing the radially supporting bearing pad 12, 13, so that the unloaded bearing pad 12, 13 may be removed in an axial direction from the recess axially towards one side of the fluid film bearing 2, in particular towards a side connected to the rotor hub 3 of the wind turbine 1, and/or in a radial direction towards the interior of the fluid film bearing 2. Also, a tilted orientation of the opening 20 to the outer circumference of the stationary part is possible so that the bearing pad 7 may be removed and/or replaced in a combined axial and radial movement. This is also possible for the embodiments shown in combination with the present invention. In a loaded state, the bearing pad 12, 13 is fixed in a form-fit connection in the recess, wherein after unloading the bearing pad 12, 13, a replacement of the bearing pad 12, 13 becomes possible.

Hence, during replacement of bearing pads 12, 13, a load between the first part 10 and the second part 11 is removed by releasing a force applied to the bearing pads 12, 13 and/or by applying a force to the first part 10 for supporting the first part 10. Afterwards, the unloaded bearing pads 12, 13 are removed in an axial and/or radial direction through the respective openings 20 and replacement bearing pads 12, 13 are inserted. Then, the first part 10 is supported on the replacement bearing pad 12, 13 by applying a force to the replacement bearing pad 12, 13 and/or by removing the force applied to the first part 10.

Figure 3:
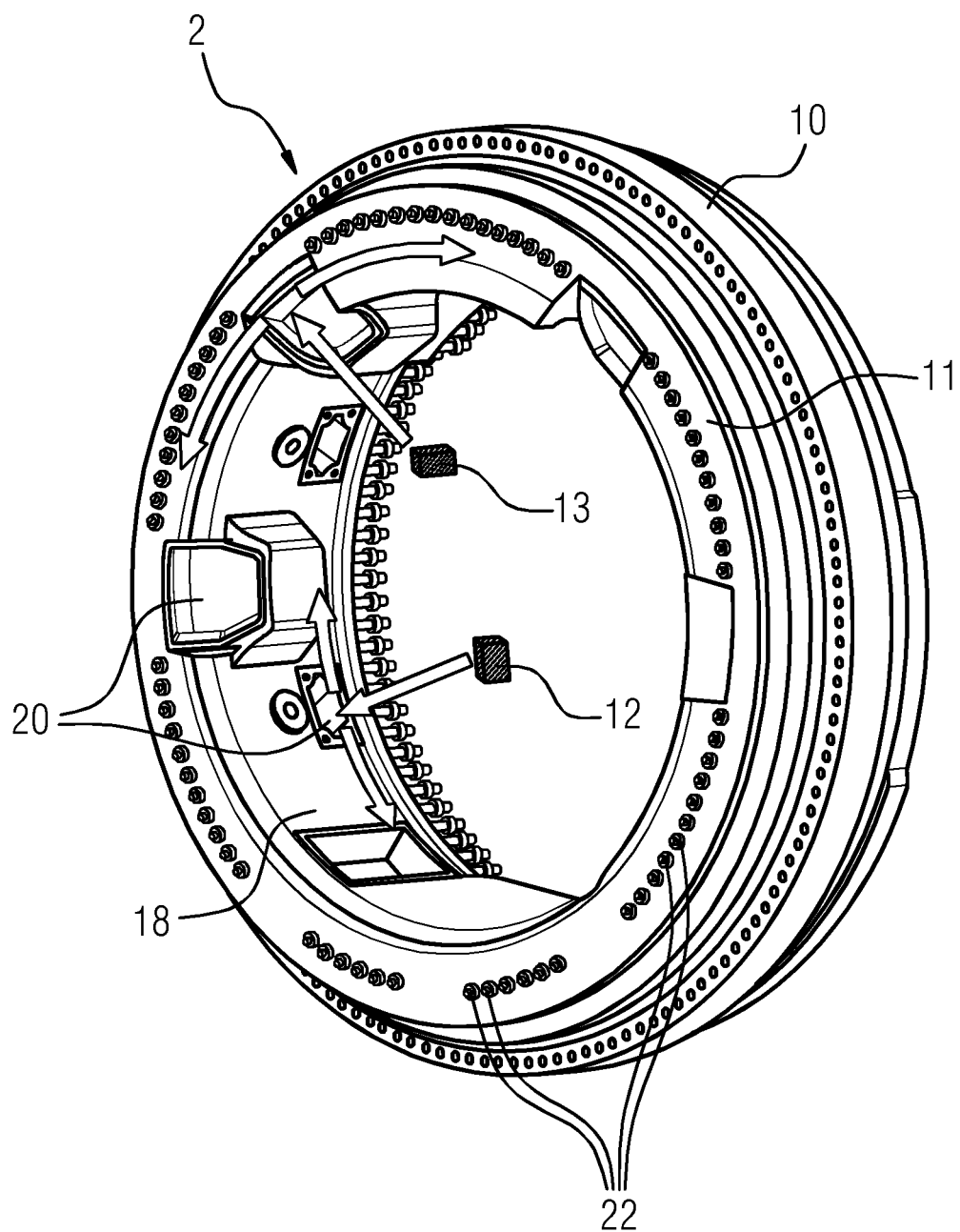
FIG. 3 shows a fluid film bearing for a rotor hub of a wind turbine according to an embodiment of the present invention.

FIG. 3 shows a fluid film bearing 2 for a rotor hub 3 of a wind turbine 1 according to an embodiment of the present invention. The fluid film bearing 2 comprises a first part 10 and a second part 11 rotatably coupled to each other about a longitudinal axis.

The second part 11 comprises a support structure 18 and a first group of bearing pads 12, 13 coupled to the support structure 18. The support structure 18 comprises a plurality of openings 20 for replacing the bearing pads 12, 13. In the present figure, an axial bearing pad 12 is being replaced through an axial opening on the inner circumference of the second part 11 and a radial bearing pad 13 is being replaced through a radial opening on the lateral side of the support structure 18 of the second part 11.

The number of openings 20 in the support structure 18 is lower than the number of bearing pads 12, 13 so that at least two bearing pads 12, 13 can be replaced through one of the openings 20.

The bearing pads 12, 13 are kept in position between the first part 10 and the second part 11 by coupling means 22 applying a load between the first part 10 and the second part 11, thereby applying a force to the bearing pads 12, 13 arranged between the first part 10 and the second part 11 and preventing the bearing pads 12, 13 to shift. The coupling means 22 are configured to release the load between the first part 10 and the second part 11 by untightening the coupling means 22. The coupling means 22 are a bolted connection. In particular, the bearing pads 12, 13 are fixed to the fluid film bearing 2 by the bolted connection comprising a plurality of bolts exerting a pressure between the first part 10 and the second part 11. In a mounted state of the bearing pads 12, 13, a force is acting on the bearing pads 12, 13 due to the weight of the first part 10 and the second part 11 and/or due to the bolted connection.

The coupling means 22 can also be directly used to fix the bearing pads 12, 13 to the second part 11. By tightening the coupling means 22, more force is exerted from the bearing pad 12, 13 to the sliding surface 14, 15, 16. In an embodiment, the bearing pads 12, 13 are fixed on the stationary part of the bearing 2 each by a bolted connection comprising a plurality of bolts.

After untightening the bolts, the bearing pads 12, 13, or the sliding part of the bearing pads 12, 13, can be removed from the fluid film bearing 2. Depending on the location of the opening 20, the bearing pads 12, 13 are removed in a radial direction or in an axial direction. After insertion of the replacement bearing pads 12, 13 into the opening 20, the load can be applied again to keep the bearing pads 12, 13 by tightening the coupling means 22.

Figure 4:
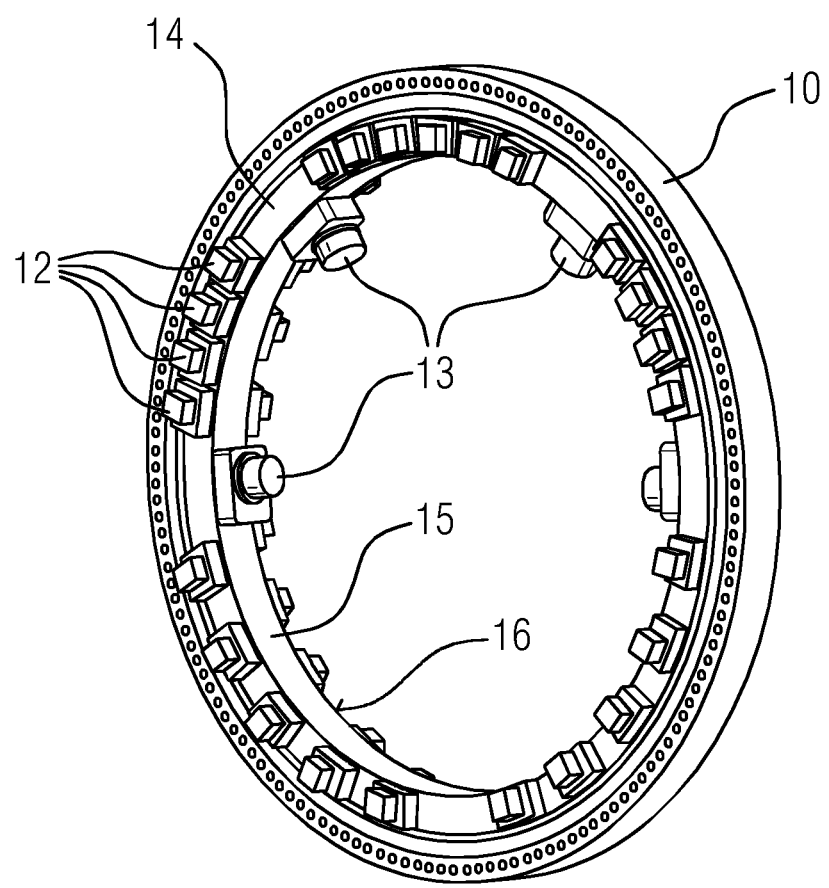
FIG. 4 shows a first part of the fluid film bearing for a rotor hub of a wind turbine according to another embodiment of the present invention.

FIG. 4 shows a first part 10 of the fluid film bearing 2 for a rotor hub 3 of a wind turbine 1 according to another embodiment of the present invention. The axial bearing pads 12 and the radial bearing pads 13, which are coupled to the second part 11, are shown in this figure. However, the second part 11 is not shown in the figure. The axial bearing pads 12 have a bearing pad sliding surface 17 which slides in the first group of axial bearing pads 12 on the first sliding surface 14 of the first part 10 and in the second group of axial bearing pads 12 on the third sliding surface 16 of the first part 10. The second part 11 further comprises radial bearing pads 13. The radial bearing pads 13 have a bearing pad sliding surface 17 which slides on the second sliding surface 15 of the first part 10.

Figure 5:
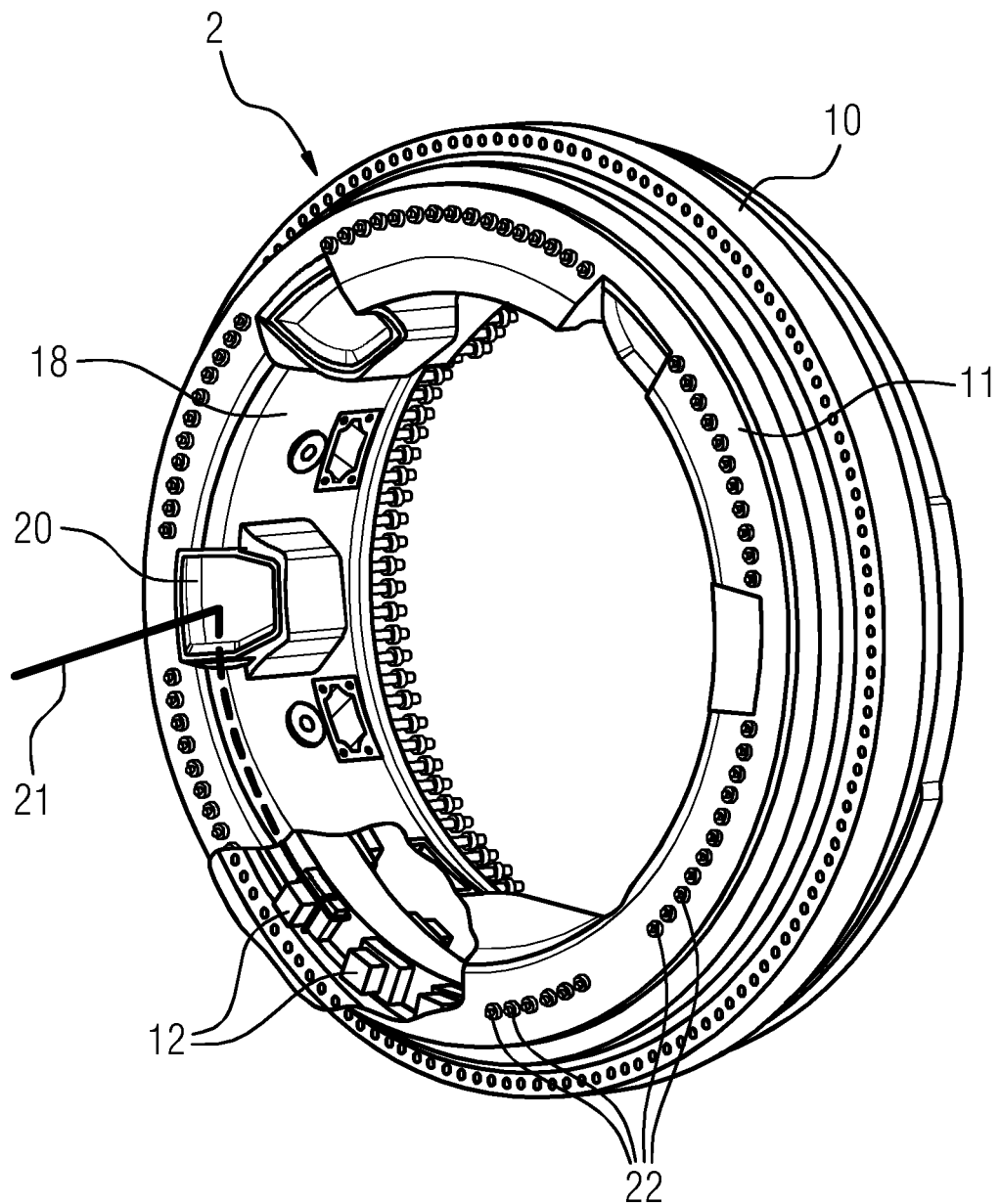
FIG. 5 shows the replacement of bearing pads in a fluid film bearing for a rotor hub of a wind turbine according to another embodiment of the present invention.
Figure 6:
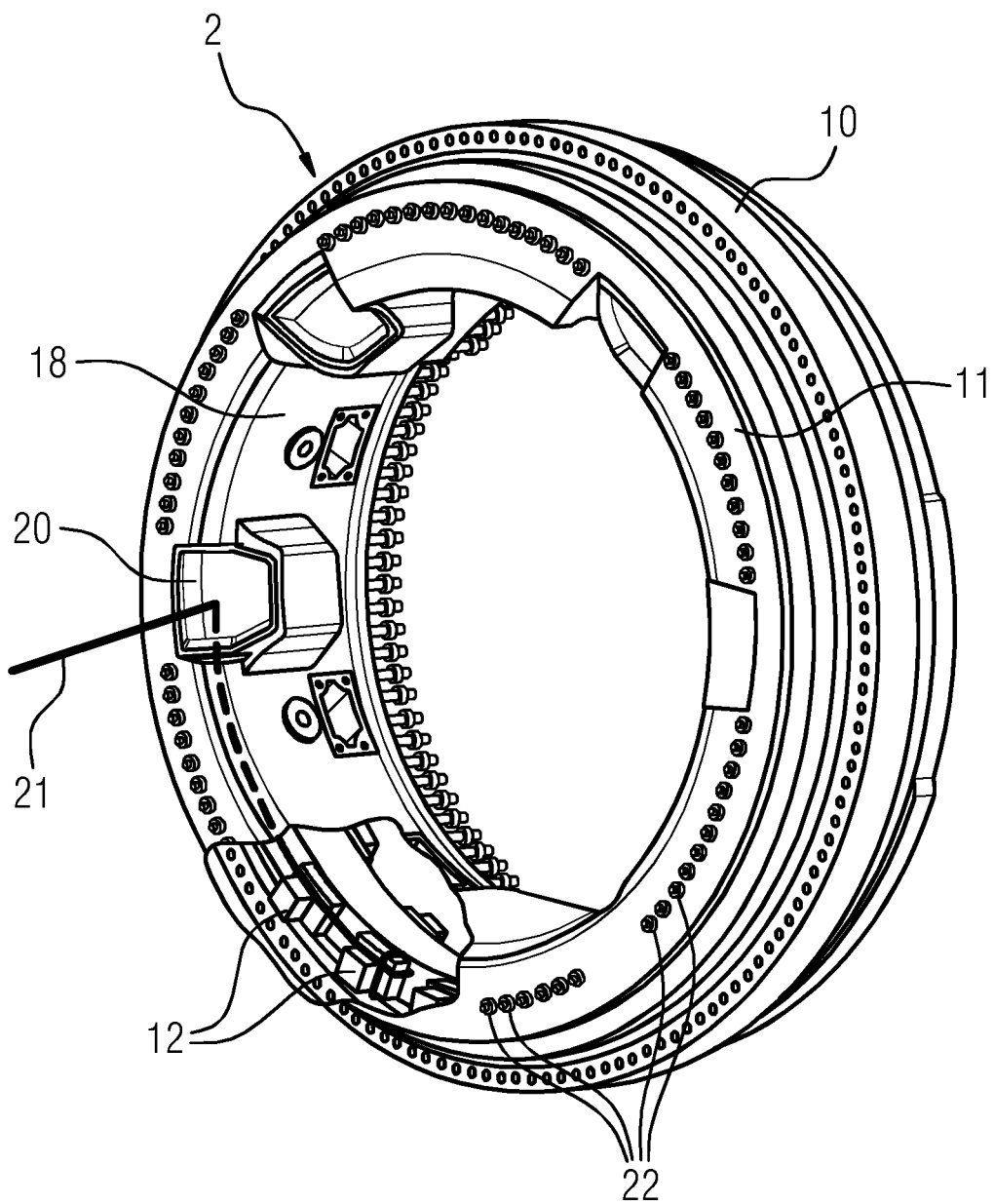
FIG. 6 shows the replacement of bearing pads in a fluid film bearing for a rotor hub of a wind turbine according to another embodiment of the present invention.

FIGS. 5 and 6 show the replacement of bearing pads 12, 13 in a fluid film bearing 2 for a rotor hub 3 of a wind turbine 1 according to another embodiment of the present invention. The replacement is done by means of a rope 21, which can be attached to the sliding pad 12, 13 to be replaced so that the sliding pad 12, 13 can be shifted to the opening 20 for replacement.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 Wind turbine
2 Fluid film bearing
3 Rotor hub
4 Housing
10 First part
11 Second part
12 Axial bearing pad
13 Radial bearing pad
14 First sliding surface
Second sliding surface (for radial pads)
16 Third sliding surface
17 Bearing pad sliding surface
18 Support structure
Opening
21 Rope
22 Coupling means

The invention claimed is:

1. A fluid film bearing for a rotor hub of a wind turbine comprising a first part and a second part rotatably coupled to each other about a longitudinal axis,
   wherein the first part comprises an annular first sliding surface extending in the circumferential direction of the fluid film bearing along the first part, wherein the second part comprises a support structure and a first group of bearing pads coupled to the support structure and having a bearing pad sliding surface configured to slide on the first sliding surface,
   wherein the support structure comprises a plurality of openings for replacing the bearing pads,
   wherein the number of openings in the support structure is lower than the number of bearing pads so that at least two bearing pads can be replaced through one of the openings,
   wherein the first part further comprising an annular second sliding surface extending in the circumferential direction of the fluid film bearing along the first part,
   wherein the second part further comprising a second group of bearing pads coupled to the support structure and having a bearing pad sliding surface configured to slide on the second sliding surface, and
   wherein the second group of bearing pads comprises radial bearing pads.

2. A fluid film bearing according to claim 1, wherein the first group of bearing pads comprises axial bearing pads.

3. The fluid film bearing according to claim 1, wherein the first part further comprising an annular third sliding surface extending in the circumferential direction of the fluid film bearing along the first part,
   wherein the second part further comprising a third group of bearing pads coupled to the support structure and having a bearing pad sliding surface con-figured to slide on the third sliding surface, and
   wherein the third group of bearing pads comprises axial bearing pads.

4. The fluid film bearing according to claim 1, wherein the first part is arranged on an outer circumference of the second part and/or radially outwards of the second part.

5. The fluid film bearing according to claim 4, wherein the openings are arranged at the outer circumference of the second part.

6. The fluid film bearing according to claim 1, wherein the first part is a rotatable part and the second part is a stationary part.

7. The fluid film bearing according to claim 1, wherein each bearing pad is arranged in a cavity or recess of the support structure.

8. A method of replacing bearing pads of a fluid film bearing according to claim 1 through a first opening of the plurality of openings of the support structure, the method comprising:
   reducing a load between the first part and the second part by releasing a force applied to a first bearing pad and/or by applying a force to the first part and/or the second part, displacing the first bearing pad to the first opening, pulling the first bearing pad through the first opening,
   inserting a replacement first bearing pad through the first opening and displacing the replacement first bearing pad to the original position of the replaced first bearing pad, and
   restoring the reduced load between the first part and the second part by performing one of the following: 1) increasing the force applied to the replacement first bearing pad and 2) applying a force to one of the following: 2(i) to the first part and 2(ii) to the second part so that in each case of 1) or 2) the replacement first bearing pad is kept in position.

9. The method of replacing bearing pads of a fluid film bearing according to claim 8, wherein a second bearing pad is replaced through the first opening following the steps for replacing the first bearing pad through the first opening.

10. The method of replacing bearing pads of a fluid film bearing according to claim 9, wherein a rope or string is attached to the first bearing pad and/or to the second bearing pad for pulling the first bearing pad and/or the second bearing pad through the first opening.

11. The method of replacing bearing pads of a fluid film bearing according to claim 9, wherein the first and second bearing pads are both replaced before the reduced load between the first part and the second part is restored in the last step of the method.

12. A wind turbine comprising a fluid film bearing according to claim 1.

13. A fluid film bearing for a rotor hub of a wind turbine comprising a first part and a second part rotatably coupled to each other about a longitudinal axis,
   wherein the first part comprises an annular first sliding surface extending in the circumferential direction of the fluid film bearing along the first part,
   wherein the second part comprises a support structure and a first group of bearing pads coupled to the support structure and having a bearing pad sliding surface configured to slide on the first sliding surface,
   wherein the support structure comprises a plurality of openings for replacing the bearing pads,
   wherein the number of openings in the support structure is lower than the number of bearing pads so that at least two bearing pads can be replaced through one of the openings, and
   wherein the bearing pads are kept in position between the first part and the second part by coupling means applying a load between the first part and the second part, thereby applying a force to the bearing pads arranged between the first part and the second part and preventing the bearing pads from shifting, whereby the coupling means are configured to release the load between the first part and the second part by untightening the coupling means.

14. The fluid film bearing according to claim 13, wherein the coupling means are bolts.

15. A fluid film bearing for a rotor hub of a wind turbine comprising a first part and a second part rotatably coupled to each other about a longitudinal axis,
   wherein the first part comprises an annular first sliding surface extending in the circumferential direction of the fluid film bearing along the first part, wherein the second part comprises a support structure and a first group of bearing pads coupled to the support structure and having a bearing pad sliding surface configured to slide on the first sliding surface,
   wherein the support structure comprises a plurality of openings for replacing the bearing pads,
   wherein the number of openings in the support structure is lower than the number of bearing pads so that at least two bearing pads can be replaced through one of the openings,
   wherein the first part further comprises a further annular sliding surface extending in the circumferential direction of the fluid film bearing along the first part,
   wherein the second part further comprises a further group of bearing pads coupled to the support structure and having a bearing pad sliding surface configured to slide on the further annular sliding surface, and
wherein the further group of bearing pads comprises axial bearing pads.

* * * * *